1

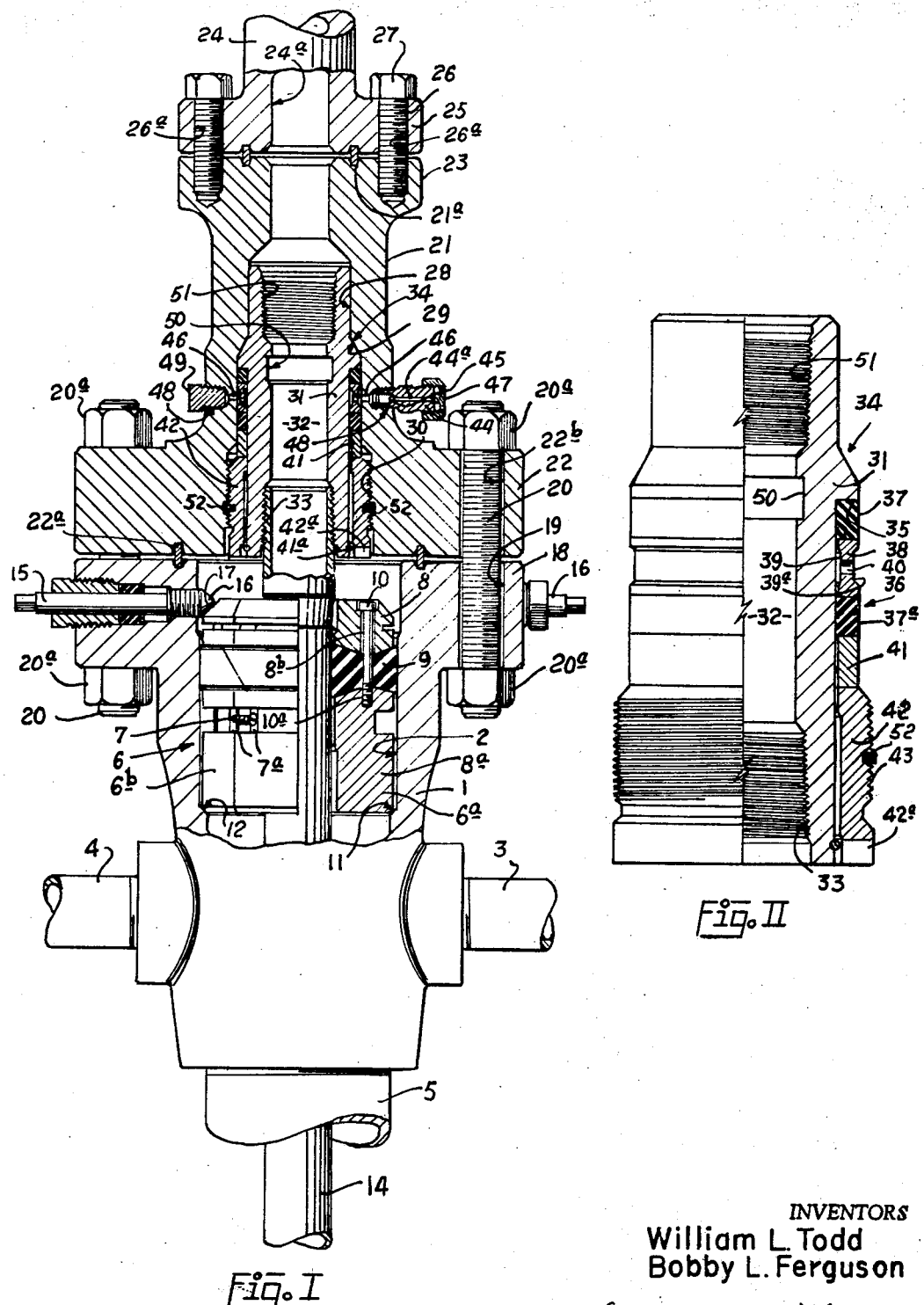

3,494,638
TUBING HANGER AND SEAL ASSEMBLY
FOR WELL HEADS
William L. Todd and Bobby L. Ferguson, both of
1400 E. Berry St., Forth Worth, Tex. 76101
Filed Apr. 14, 1967, Ser. No. 630,854
Int. Cl. F16l 55/00, 35/00
U.S. Cl. 285—93        9 Claims

ABSTRACT OF THE DISCLOSURE

A tubing hanger assembly including an adapter and seal assembly, mounted between the tubing head and the valve fitting at the top of a well, with the seal assembly being mounted in the bore of the adapter body, and held therein by a removable retaining nut and with the addition of a liquid seal injection valve communicating with the seal therein and a test port through the wall of the adapter for receiving a gauge for testing the seal prior to installing the adapter on the tubing head.

BACKGROUND OF INVENTION

Tubing hangers and seal assemblies heretofore developed for well heads have offered an imperfect solution to problems encountered in supporting long strings of tubing in wells.

The tubing hanger and seal assembly must support the weight of the tubing while providing a pressure tight seal thereabout. The devices heretofore developed for this purpose have lacked dependability and require excessive labor for replacing or re-energizing seals in the seal assembly. Installing the hanger or replacing the seals required rotation of either the Christmas tree assembly or the tubing string.

SUMMARY OF THE INVENTION

The improvement comprising the invention disclosed herein includes an adapter which has a bore which is therein having a shoulder intermediate the ends of the bore threaded at one end, and a hollow seal assembly insertable into the bore having a shoulder positionable against the shoulder in the bore with the dual seal disposed thereabout and positioned against a shoulder about the seal body.

A gland nut may be threadedly engaged with the threads in the bore about the seal body to support and expand the seal thereabout without the necessity of rotating the adapter body or the seal body, or the valve assembly thereabove. The seal is a double seal separated by a perforated ring with channels on either side thereabout. A test port communicates with the channels for the mounting of a gauge for testing the seal prior to installing it on the tubing head, and another opening communicates with the channel about the seal ring wherein a check valve may be positioned through which plastic seal material may be injected in the channel as a back up seal either when the unit is installed or thereafter.

The construction of the seal assembly permits testing prior to attaching the adapted to the tubing head, and permits plastic seal material to be injected about the seal to provide a back up seal or to reenergize the seal if a leak occurs at any time during its use.

The seal body has a threaded bore therein attachable to the tubing string which extends through the tubing head, and the seal body is free to move downwardly with reference to he seal assembly and the retaining nut so that the tubing weight may be employed to energize the seal.

The retaining nut while positioning and holding the seal within the adapter bore permits rapid make up in the adapter without rotating the adapter, the "Christmas tree" or seal unit as the case may be.

Other and further objects of the invention will become apparent upon reading the detailed specification hereinafter following and by referring to the drawings annexed hereto.

DESCRIPTION OF DRAWING

A suitable embodiment of the invention is shown in the attached drawing, wherein, FIGURE I is a cross-sectional elevational view of the adapter and seal assembly mounted on a tubing head, FIGURE II is a quarter-sectional elevational view of the seal assembly.

Numeral references are employed to indicate the various parts shown in the drawings and like numerals indicate like parts throughout the various figures of the drawings.

DECRIPTION OF A PREFERRED EMBODIMENT

The numeral 1 indicates a tubing head having a bore 2 therethrough.

Circulation conduits 3 and 4 communicate with the bore of the tubing head for the purpose of injecting fluid into or releasing same from the annulus between the tubing 14 and the casing 5. A tubing hanger and seal assembly 6 is made up of two halves 6a and 6b positioned about the tubing 14, and the halves are held together by a screw 7 threadedly engaged between attachment lugs 7a, secured to the adjoining edges of the halves 6a and 6b.

The wrap-around hanger assembly 6 is comprised of a split top ring 8 and a lower split plate 8a between which are positioned split seal ring 9 engaged with opposed conical surfaces on the inner sides of the ring 8 and plate 8a. Screws 10 are passed through appropriate bores 8b in the ring 8, and through coinciding passages in the seal rings 9 and are threadedly engaged at 10a to the plates 8a.

The seal assembly 6 is seated on a tapered shoulder 11 in the lower end of the bore 2.

The upper ring 8 has a tapered shoulder 17 in the passage therethrough.

Holddown screws 15 are threadedly engaged through the wall of the tubing head 1 and have tapered inner ends 16 thereon arranged to come into contact with the tapered upper ends 17 of the ring segments 8 to press the tubing head seal assembly downward against the shoulder 11 after it has been positioned therein. By co-action between the tapered surfaces 16 and 17 the ring 8 is moved downwardly with reference to the screws 10 to compress and expand the seal ring 9 into sealing engagement between the bore 2 and the tubing string 14.

The tubing head 1 has an annular flange 18 thereon with stud receiving holes 19 therethrough and spaced thereabout.

The adapter body 21 has a corresponding flange 22 thereon. The flanges 18 and 22 are drawn together against the metal seal ring 22a to provide a seal between the adjoining faces thereof by the threaded studs 20 extending through the passages 19 and 22b therein and the nuts 20a threadedly engaged to the outer ends of the studs.

The adapter body 21 has an annular flange 23 on the upper end thereof.

A Christmas tree adapter 24 has a bore 24a therethrough communicating with the bore 28 through the adapter body 21. The bore 24a in Christmas tree adapter 24 is in communication with the valve outlets in the Christmas tree at the top of the well.

A flange 25 is provided on the lower end of the adapter 24 which is drawn toward the flange 23 by the nuts 27 threadedly engaged on the studs 26, which are threaded to suitable threaded bores in the flange 23 and pass through holes 26a provided through the flange 25. As the flanges 23 and 25 are drawn together the metal seal ring 21a is compressed in opposed grooves in the faces of the flanges 25 and 23 to provide a seal therebetween.

A bore 28 is provided through the adapter body 21 in which is formed a downwardly facing bevelled shoulder 29 against which may be seated the corresponding upwardly facing bevelled shoulder 34 on the valve and seal body 31. The relative taper of shoulders 29 and 34 may be such as to provide a metal to metal seal therebetween when forced together.

A threaded counterbore 30 is provided in the bore in which may be threadedly engaged the retainer ring 42.

The seal body 31 has a bore 32 therethrough in the lower end of which is a threaded counterbore 33 to which the tubing string 14 may be threadedly engaged.

A seal retaining shoulder 35 is provided about the seal body 31 against which the seal assembly 36 may be positioned.

The seal assembly 36 includes resilient seal rings 37 and 37a disposed about the seal body 31 which are separated by the metal ring 38.

The metal ring 38 includes a groove 39 about the inner side thereof providing annular channels 39 and 39a between the body 31 and the ring 38 and between body 21 and the ring 38. A plurality of ports 40 are provided through the ring 38 which communicate with the channels 39 and 39a for the purposes hereinafter mentioned.

A bottom rigid ring 41 is disposed about body 31 below the lower resilient seal ring 37a and is supported by the retainer ring or nut 42 therebelow. In assembling the seal assembly with the seal body 31, the seal assembly 36 is slipped over the body 31 and moved against the shoulder 37. The retainer nut 42 is then positioned about the lower ends of the body 31 and brought into engagement with the lower support ring 41 and a snap ring 41a is installed in a groove about the lower end of body 31 to retain the nut on the body. The body 31 with seal assembly thereabout may then be inserted in the bore 28 until shoulder 34 contacts shoulder 29. The retainer ring 42 is rotated into the threaded bore 30 by co-action of the threads 43 on the outer side thereof with the threads in the threaded bore 30. The retainer ring 42 may be rotated for threading into the bore 30 by engagement of wrench slots 42a on the lower end thereof with a suitable wrench. Resilient friction plugs 52 made of Teflon or other resilient material, may be inserted in bores provided 90° apart on the outer wall of the nut 42, with the outer ends pressed between the co-engaging threads in the counterbore 30 and on the outer surface of nut 42 to prevent ring 42 from backing off after being threaded into counterbore 30.

Ports 46 pass through the wall of the adapter body 21 adjacent the separator ring 38, and communicate with threaded bores 48 provided in the wall of the adapter body 21.

The threaded bores 48 are arranged to receive closure plugs 49 or injection valve bodies 44. A pressure testing gauge (not shown) may be threadedly engaged in one of the test ports 48.

A cover plate 47 is threadedly engaged about the outer end of the injection valve body 44 to close the passage 44a therethrough. Communication through passage 44a is further controlled by a back-flow ball check valve 45.

The retainer ring 42 is threadedly moved inwardly of the bore 28 sufficiently to expand the packing rings 37 and 37a into sealing engagement with the bore.

After the seal rings have ben expanded the seal provided thereby may be tested by threadedly engaging a pressure gauge in one of the threaded passages 48 and subjecting the bore 28 to pressure to determine whether such pressure leaks by the expanded seal rings 37 and 37a.

This test may be carried out after the seal assembly has been assembled with the adapter body 21 and prior to installing same on the tubing head. Thus the adapter and seal unit may be separately assembled and tested for leakage prior to installation on the tubing head.

In assembling and installing the equipment shown in FIGURE I, the tubing hanger 6 is connected about the tubing and lowered into the tubing head core 2 to seat the shoulder 11 thereon on the shoulder 12 in the bore.

The adapter seal assembly may be assembled with the tubing head 1 by threadedly engaging the threads 33 and the seal body 31 with the threads 43 on the outer surface of the retainer nut 42. The holes 22b and 19 in the flanges 18 and 22 are lined up, and the studs 20 pass therethrough and secured therein by threading the nuts 20a thereon.

It will thus be seen that the tubing string 14 is suspended to the valve body 31 so that the seal assembly 36 is further compressed by the weight of the tubing, it being noted that the tubing 14 is freely movable through the tubing head seal assemblies 6 until the shoulder 13 comes into contact with the shoulder 12 to further compress the seal ring 9 of the tubing head seal assembly 6.

Plastic sealing fluid may be injected through the valve fitting 44 by a suitable pressure injection device and through the test ports 46 and ports 40 in the separator ring 38 to cause the plastic seal material to fill the channels 39 and 39a and thereby provide a back up seal, or in the event the seal leaks after installation, the plastic seal material may be injected into the channel 39 and 39a to re-energize the seal.

The seal assembly 36 may be installed or replaced at any time by disconnecting the adapter body 21 from the tubing head 1, and removal of the retainer nut 42 from the bore 28 by rotating same by engagemnt therewith of a spanner wrench in wrench slots 42a. This may be accomplished without rotating the adapter body 21, without disengagement and rotation of the Christmas tree attached to the upper end of the adapter body 21, and without disturbing a backflow check valve which might be installed within the seal body 31.

The seal body 31 is provided with an annular recess 50 therein with which a disengageable backflow check valve unit (not shown) may be engaged by expanding retractable dogs carried by the backflow check valve assembly in the groove 50. Such a backflow check valve may be installed by insertion through the Christmas tree assembly to permit circulation in work-over procedure and prevent reverse back presure flow. Threads 51 are also provided in the end of the bore 32 of the seal body 31 for the purpose of threadedly engaging a backflow check valve or other equipment if desired.

It will be seen that we have provided a tubing hanger assembly including an adapter and seal unit to be installed betwen the tubing head and Christmas tree assembly thereabove which may be assembled as a unit and tested prior to installation on the tubing head, in which the seal assembly may be installed or replaced by the removal of a retainer nut without rotating the adapter body or the Christmas tree assembly attached thereabove and without disturbing a valve unit which may be installed in the seal body, and we have provided such an adapter and seal unit wherein the seal body is attachable to and movable with the tubing string so as to utilize the weight of the tubing in expanding and setting the packing therein.

Having described our invention we claim:

1. An adapter and seal assembly for a pipe hanger comprising, an adapter body having a bore therethrough; a seal body having a bore therethrough and positionable in the bore of the adapter body; means in the lower end of the bore of the seal body arranged to be engaged with the upper end of a tubing string to suspend the tubing string thereto; shoulder means intermediate opposite ends of the bore of the adapter body engageable with shoulder means on the outer surface of the seal body arranged to limit upward movement of the seal body into the bore of the adapter body; a seal assembly carried about the seal body; means on the seal body arranged to cause the seal assembly to be expanded by the weight of the tubing string into sealing engagement with the bore of the adapter body; a hollow nut arranged to be freely passed about the outer surface of the lower end of the seal body engageable with the seal assembly to retain same in the bore of the adapter body; and cooperating threads in the lower end of the bore of the adapter body and on the outer surface of the nut to permit the nut to be threaded inwardly and outwardly of the bore about the seal body said outer surface of the lower end of the seal body having a circumferentially continuous cylindrical outer surface.

2. The combination called for in claim 1 with the addition of an annular recess about the inner side of the bore of the seal assembly arranged to receive a valve assembly.

3. The combination called for in claim 1 wherein the seal assembly about the seal body is comprised of a pair of resilient seal rings, a rigid separator ring therebetween a substatnially flat planar surface on the upper and lower edges of the separator ring channels about the inner and outer sides of the separator ring; at least one passage through the ring communicating with the channels; a test port provided through the wall of the adapter body communicating with the passage and the channels; and a threaded bore in the outer wall of the adapter body communicating with the port and the passage arranged to receive a pressure gauge, a check valve body or a closure plug.

4. The combination called for in claim 1 wherein the shoulder means in the bore of the adapter body and on the outer surface of the seal body comprise opposed surfaces tapered to providing a metal to metal seal.

5. The combination called for in claim 1 with the addition of friction means between the outer surface of the nut and the bore of the adapter body to prevent the nut from unthreading.

6. The combination called for in claim 5 wherein the friction means comprises at least one resilient plug disposed on the outer surface of the nut frictionally engageable with the bore of the adapter body.

7. The combination called for in claim 1 wherein the means on the seal body arranged to cause the seal assembly to be expanded comprises a downwardly facing shoulder means about the seal body against which the seal assembly is abutted; and wherein the means for attachment and suspension of a tubing string to the lower end of the seal body whereby the weight of the tubing string can be exerted downwardly on the seal assembly to expand same comprises threads.

8. The combination called for in claim 1 with the addition of a snap ring about the seal body arranged to engage the nut to retain the nut on the body.

9. An adapter and seal assembly for a pipe hanger comprising, an adapter body having a bore therethrough; a seal body having a bore therethrough and positionable in the bore of the adapter body; threads in the lower end of the bore of the seal body arranged to be threadedly engaged with the upper end of a tubing string to suspend the tubing string thereto; shoulder means in the bore of the adapter body engageable with shoulder means on the outer surface of the seal body arranged to limit the movement of the seal body into the bore of the adapter body; opposed surfaces on the said shoulders being tapered to provide a metal to metal seal; a seal assembly carried about the seal body arranged to be expanded into sealing engagement with the bore of the adapter body, wherein the seal member about the seal assembly is comprised of a pair of resilient seal rings, a rigid separator ring therebetween, channels about the inner and outer sides of the separator ring, and at least one passage through the ring communicating with the channels; a test port provided through the wall of the adapter body communicating with the passage and the channels; and a threaded bore in the outer wall of the adapter body communicating with the port and the passage aranged to receive a pressure gauge, a check valve body or a closure plug; a hollow nut arranged to be freely passed about the outer surface of the seal body engageable with the seal assembly to retain same in the bore of the adapter body; and cooperating threads in the bore of the adapter body and on the outer surface of the nut to permit the nut to be threaded inwardly and outwardly of the bore about the seal body; and at least one resilient plug disposed on the outer surface of the nut engageable with the bore of the adapter body to prevent the nut from unthreading.

References Cited
UNITED STATES PATENTS

| | | | |
|---|---|---|---|
| 3,185,505 | 5/1965 | Lanmon | 285—143 X |
| 1,034,737 | 8/1912 | Scott | 285—338 X |
| 1,807,046 | 5/1931 | Rasmussen et al. | 285—356 X |
| 2,205,988 | 6/1940 | McEvoy et al. | 285—143 |
| 2,491,598 | 12/1949 | Allen | 285—93 |
| 2,768,841 | 10/1956 | Allen | 285—143 |
| 2,954,742 | 10/1960 | Williams | 285—143 |
| 3,144,066 | 8/1964 | Van Helke | 151—7 |
| 3,376,053 | 4/1968 | Novakovich et al. | 285—351 X |

DAVID J. WILLIAMOWSKI, Primary Examiner

DAVE W. AROLA, Assistant Examiner

U.S. Cl. X.R.

285—143, 347, 348, 351, 356; 151—7